United States Patent [19]

Streckert et al.

[11] Patent Number: 5,067,999
[45] Date of Patent: Nov. 26, 1991

[54] METHOD FOR PROVIDING A SILICON CARBIDE MATRIX IN CARBON-FIBER REINFORCED COMPOSITES

[75] Inventors: Holger H. Streckert, San Diego; James E. Sheehan, Solana Beach; Khodabakhsh Mazdiyasni, Alpine, all of Calif.

[73] Assignee: General Atomics, San Diego, Calif.

[21] Appl. No.: 565,953

[22] Filed: Aug. 10, 1990

[51] Int. Cl.$^5$ .................. C04B 35/56; C04B 35/76
[52] U.S. Cl. .................. 156/89; 156/333.1; 264/60; 427/299; 427/419.8; 427/443.2
[58] Field of Search .................. 264/62, 60, 66, 56, 264/135, 137, 257, 258, 271.1; 427/299, 419.8, 443.2; 156/89, 331.1

[56] References Cited

U.S. PATENT DOCUMENTS

| | | | |
|---|---|---|---|
| 3,672,936 | 6/1972 | Ehrenreich | 117/46 |
| 3,936,574 | 2/1976 | Marin | 428/408 |
| 4,080,417 | 3/1978 | Kishimoto et al. | 264/29.2 |
| 4,917,279 | 4/1980 | Saito et al. | 423/265 |
| 4,220,600 | 9/1980 | Yajima et al. | 556/434 |
| 4,267,211 | 5/1981 | Yajima et al. | 427/228 |
| 4,284,615 | 8/1981 | Maruyama | 423/447.4 |
| 4,409,125 | 10/1983 | Nishino et al. | 502/180 |
| 4,424,145 | 1/1984 | Sara | 252/509 |
| 4,492,681 | 1/1985 | Endou et al. | 423/345 |
| 4,496,631 | 1/1985 | Adachi et al. | 428/394 |
| 4,544,412 | 10/1985 | Veltri et al. | 106/286.5 |
| 4,562,040 | 12/1985 | Yamada et al. | 419/23 |
| 4,591,492 | 5/1986 | Tanaka et al. | 423/345 |
| 4,603,042 | 7/1986 | Setsuie et al. | 423/447.4 |
| 4,604,367 | 8/1986 | Takamizawa et al. | 501/95 |
| 4,640,830 | 3/1987 | Arakawa | 423/346 |
| 4,663,105 | 5/1987 | Sakai et al. | 264/66 |
| 4,668,642 | 5/1987 | Bujalski | 501/88 |
| 4,686,096 | 8/1987 | Schulz et al. | 423/447.1 |
| 4,837,230 | 6/1989 | Chen et al. | 501/88 |
| 4,892,790 | 1/1990 | Gray | 428/548 |
| 4,915,760 | 4/1990 | Singh et al. | 156/89 |
| 4,923,719 | 5/1990 | Karasek et al. | 427/387 |

OTHER PUBLICATIONS

Fiber-Reinforced Silicon Carbide, *American Ceramic Society Bulletin*, pp. 326–335 (1986).

*Primary Examiner*—Jan H. Silbaugh
*Assistant Examiner*—Christopher A. Fiorilla
*Attorney, Agent, or Firm*—Fitch, Even, Tabin & Flannery

[57] ABSTRACT

A method for producing shapes utilizing carbon-based fiber cloth materials embedded in silicon carbide matrices. Boron compound is applied to a preform which may be a plurality of carbon fiber sheets in a stack or which may be a complex three dimensional structure, such as a braided tube or a woven fiber network with filaments running in a plurality of different directions. Alternatively, individual sheets can be treated and then stacked or otherwise formed into a preform. Boron is applied in a form in which it serves as a wetting/bonding agent. The preform or each of the sheets is then impregnated with a polysilane resin. If sheets are used, the sheets are then stacked in mating face-to-face relationships in a desired preform shape. Thereafter, the preform is heated in a first heating step to a temperature sufficient to cross-link the polysilane, and then heated in a second heating step to a temperature sufficient to transform the crosslinked resin into a silicon carbide matrix having the carbon fiber network embedded therein.

20 Claims, No Drawings

METHOD FOR PROVIDING A SILICON CARBIDE MATRIX IN CARBON-FIBER REINFORCED COMPOSITES

FIELD OF THE INVENTION

The present invention relates generally to a method for providing a composite of silicon carbide and carbon fibers utilizing carbon-based fiber cloth. More particularly, the present invention relates to a method for providing carbon-based fiber cloth embedded in a silicon carbide matrix by impregnating the carbon-based fiber cloth with a polysilane followed by conversion of the silicon in the polysilane to a silicon carbide matrix with the carbon-base fiber cloth embedded therein.

BACKGROUND OF THE INVENTION

Carbon fiber-carbon matrix composites (sometimes referred to as "carbon-carbon composites") and ceramic fibers coated with carbon in a carbon matrix are a class of materials whose properties are especially suitable for use at elevated temperatures. The temperature capability of carbon-based composites makes them exceptionally attractive for various aerospace applications, including gas turbine engines. The most significant drawback in the use of carbon-based composites in high temperature applications is the susceptibility of carbon-based materials to oxidize at high temperatures.

Carbon fibers are particularly attractive for use in various applications, since the carbon fibers can be formed into a cloth and the cloth can be preformed into various desired shapes prior to final formation of a desired part. Carbon fiber materials are usually produced starting with an organic precursor fiber, such as polyacrylonitrile, rayon or pitch. Such fibers are usually produced in the form of yarn, often by an extrusion process. The precursor fibers are heated in an inert atmosphere to pyrolyze or carbonize the fibers and may then be heated to a higher temperature to form graphite fibers. These carbon graphite materials may then be laid down, woven or interleaved to form various structures depending on the number and weave of the fibers. The woven structures can then be impregnated with a pitch or resin matrix material which is converted to carbon and then graphite to form a carbon-carbon fiber composite. In this process, hot pressing is also employed to obtain a dense structure. Repeated impregnation steps can be employed to increase density. Carbon fiber-carbon matrix composites can also be formed by chemical vapor infiltration to deposit a pyrolytic graphite matrix.

It is well known in the prior art to use silicon carbide conversion coatings employing a pack coating process to protect carbon-based materials, including carbon-based composites. The coatings are referred to as conversion coatings because the surface of the article to be coated, i.e., a carbon-based composite, is converted to silicon carbide by reacting it with silicon. Pack coating refers to processes wherein a carbon-based material is embedded and heated in a pack material which produces silicon or silicon compound vapors when heated. Pack compositions based on aluminum oxide, silicon and silicon oxide are known.

U.S. Pat. No. 4,544,412 to Veltri, et al. is directed to a particular pack material for the formation of silicon carbide coatings on carbon-carbon composite materials. A pack coating refers to the method for providing the silicon carbide coating wherein a carbon-carbon composite is dispersed in a powdered pack and is heated while in contact with the pack material. The pack material of the Veltri et al. patent consists of about 60% silicon carbide powder, about 30% silicon powder, about 1% boron powder and about 9% aluminum oxide powder.

U.S. Pat. No. 4,267,211 to Yajima, et al. describes a process for producing a shaped article having resistance to corrosion, heat and oxidation. In the method, a shaped article is coated with a coating composition comprising a organometallic compound and the coated article is subjected to heat treatment. The shaped article is composed of at least one material selected from metals, carbonaceous substances, and ceramics. The organometallic compound comprises at least one polymer selected from the group consisting of polycarbosilanes and polycarbosiloxanes. U.S. Pat. No. 4,915,760 to Singh, e al. teaches depositing an organic slurry of ceramic particles onto parallel boron-coated filaments of silicon carbide and hot pressing a multilayered stack.

Additions of boron compounds and boron throughout a matrix of carbon-base materials to reduce oxidation sensibility is also known as set forth in U.S. Pat. No. 3,672,936 to Ehrenreich. The Ehrenreich patent discloses a reinforced carbon article which comprises a carbon fiber shape bonded by a carbon binder and having incorporated within the carbon shape, the in situ reaction product of carbon and a boron containing additive. The boron containing additive is a material selected from the group consisting of boron, boron nitride, boron silicide and refractory metal borides. The method of the Ehrenrich patent comprises forming a carbon fiber shape, dispersing the boron containing additive within at least a portion of the carbon fiber shape, impregnating the carbon fiber shape with a carbonizable binder and heating the carbon fiber shape to carbonize the binder and to form in situ the reaction product of carbon and the boron containing additive.

U.S. Pat. No. 4,892,790 to Gray discloses making oxygen-resistant composites with carbon fibers dispersed within a carbonaceous matrix formed from a phenolic resin mixture which contains boron and silicon.

U.S. Pat. No. 4,923,719 teaches coating of silicon carbide fibers with an organosilane for use in fiber reinforced composites.

While various processes are known for making carbon-carbon composites, it would be desirable to provide a simple and inexpensive method for making composites wherein carbon fibers are embedded in a matrix of silicon carbide.

Accordingly, it is a principal object of the present invention to provide a method for producing a silicon carbide composite utilizing carbon-based fiber cloth materials.

SUMMARY OF THE INVENTION

In accordance with the present invention, a method is provided for producing multiple shapes utilizing carbon-based fiber cloth materials embedded in a silicon carbide matrix. In the method, boron is applied to a preform which may be a plurality of carbon fiber sheets in a stack or which may be a complex three dimensional structure, such as a braided tube or a woven fiber network with filaments running in a plurality of different directions. Alternatively, individual sheets can be treated and stacked or otherwise formed into a preform. Boron is applied in a form in which it serves as a wetting/bonding agent. The preform or each of the sheets is then impregnated with a polysilane resin. If sheets are used, the sheets are then stacked in mating face-to-face relationships in a desired preform shape. Thereafter, the preform is heated in a first heating step to a temperature sufficient to cross-link the polysilane. The preform is then heated in a second heating step to a temperature sufficient to form a silicon carbide matrix having the carbon fiber network embedded therein.

DESCRIPTION OF THE INVENTION

Generally, the present invention is directed to an advanced composite wherein carbon-based fiber cloth materials are embedded in a silicon carbide matrix created through the use of a polysilane and a boron bonding agent. The term "advanced composite" refers to a class of structural materials which have evolved as a result of the development of high-modulus, high-strength, low density fibers. Advanced composites include a wide variety of material forms, but in most cases they consist of two distinct materials: continuous reinforcing fibers embedded in a matrix. In accordance with the present invention, graphite fibers are embedded in a matrix of silicon carbide. Graphite fibers are produced in tows, which are multfilament bundles of very fine fibers, rather than as monofilaments. The method of the present invention results in a composite wherein the silicon carbide precursor compound penetrates the cloth and surrounds the fine graphite fibers comprising the tows. The graphite fibers may be laid down or woven in the tow as 1D, 2D, 3D, etc. structures where D stands for direction, i.e., in a 2D structure, the fibers are laid in two usually orthogonal directions.

In accordance with the present invention, a carbon-based fiber cloth material is first formed into a plurality of sheets of a desired shape. A boron material is then dispersed throughout the carbon sheets onto the surface of the carbon fibers. The boron is provided in a form suitable for applying a bonding amount of a boron coating onto the carbon fibers of the preform. Preferably, the boron is applied in the form of a precursor, such as an aqueous solution of boric acid. Other suitable boron precursors might be employed in the form of aqueous or nonaqueous solutions, such as decaborane.

The carbon fibers of the sheets can be coated with the desired amount of the boron in an amount sufficient to serve as a bonding agent by immersing the sheets in the boric acid solution or by spraying the boric acid solution onto the sheets. The preform is then dried at a temperature in the range of from about 100° C. to about 140° C. to deposit a bonding amount of boron on the surface of the carbon fibers. Preferably, the boron precursor is coated onto the sheets at a level sufficient to provide from about 0.1% to about 2% by weight of boron based on the weight of the carbon fibers. All percentages used herein are by weight unless otherwise indicated. The mechanism by which the boron serves as a bonding agent for the subsequent application of a polysilane is as a wetting agent. It is believed that the boron serves to draw in the polysilane when it is subsequently applied to the carbon fiber sheets. The polysilane fills the interstices between individual fibers and becomes bonded onto the surface of the fibers in the carbon fiber cloth sheet.

Subsequent to the application of a bonding amount of boron, a polysilane is applied to the carbon-based fiber cloth sheets by any suitable means. The polysilane is preferably in the physical form of a liquid and in a form suitable to impregnate the carbon-based fiber cloth preform. Suitable polysilanes for use in accordance with the method of the present invention have the formula $R_{2n+2}Si_n$ wherein R is a hydrocarbon radical selected from the group consisting of methyl, ethyl, propyl, phenyl and vinyl groups and n is an integer in the range of from 20 to 200. Preferably, the polysilane used in the present invention is a polysilane containing methyl and vinyl groups wherein n is an integer in the range of from 80 to 130. The carbon-based fiber cloth preform is preferably impregnated with the polysilane by a suitable method, such as by soaking the preform in the polysilane resin at a level sufficient to completely coat the carbon fiber cloth material with the polysilane.

In accordance with one method of the invention, impregnated carbon-based fiber cloth sheets, after being coated with a bonding amount of boron precursor and a suitable amount of polysilane, are formed into a desired preform shape by placing a plurality of impregnated sheets in mating, overlying face-to-face relationship on a platen or jig or other suitable shape forming device. The number of impregnated sheets used to make the preform is widely variable, but will generally be from about 6 to about 20.

The preform is then subjected to a first heating step. The first heating step is to a temperature in the range of from about 120° C. to about 250° C. The first heating step serves to crosslink the polysilane. The first heating step should be performed in inert gas atmosphere in the absence of oxygen which would interfere with the crosslinking of the polysilane. Thereafter, the carbon-based fiber cloth preform is subjected to a second heating step wherein silicon carbide formation takes place. The second heating step preferably takes place at a temperature of from about 700° C. to about 1000° C. Preferably, pressure is applied during both the first heating step and the second heating step. The pressure applied is preferably from about 100 psig to about 250 psig.

It is recognized that organosilane and organopolysilane compounds, such as disclosed in U.S. Pat. No. 4,492,681 to Endou et al., have been used to form silicon carbide fibers, per se. However, it is believed that the method of the present invention for forming a silicon carbide matrix with carbon-based materials embedded therein, which utilizes a boron wetting bonding agent and an organosilane or polycarbosilane compound to surround and coat the carbon fibers and form a silicon carbide matrix, is novel and provides a simple efficient method for making carbon fiber-reinforced composites having a silicon carbide matrix.

The following Example further illustrates various features of the present invention but is not intended to in any way limit the scope of the invention which is defined in the appended Claims.

EXAMPLE I

Ten 4'×8" swatches of polyacrylonitrile (PAN)-based T-300 carbon fiber fabric were soaked in a 4% aqueous boric acid solution for about 5 minutes. The treated fabric was dried at 120° C. for about ½ hour. A vinylic polysilane resin (Y-12044 obtained from Union Carbide) was applied to the swatches. The painted swatches were overlaid onto one another and vacuum-bagged. The overlaid swatches were then press-molded at a pressure of 100 psig and were then heated to 250° C. to form an integral composite precursor panel structure.

The panel was then heated to 800° C. to form a silicon carbide matrix-carbon fiber composite panel.

The composite panel was subjected to the above described steps of boric acid solution soaking, drying, impregnation with polysilane and heating to 800° C. for a total of 6–8 times until no further weight gain was obtained. The final density was 1.6–1.8g/c$^3$.

Although the invention has been described with regard to the best mode presently understood by the inventors, changes and modifications as would be obvious to one having the ordinary skill in the art may be made without departing from the scope of the invention, which is defined in the claims appended hereto. For example, although graphite fiber cloth is the preferred material for making composites of this type, other suitable fiber arrays and other carbon-based fibers as well as ceramic fibers coated with carbon may be used. Particular features of the invention are emphasized in the claims that follow.

What is claimed is:

1. A method for making a composite of a silicon carbide matrix with carbon-based fiber cloth embedded therein comprising:
   (a) providing a preform of carbon-based fiber,
   (b) applying a soluble boron compound to the surface of the fibers which form said preform, said boron being in a form suitable for disposing a bonding amount of said boron compound onto said fiber surfaces of said preform,
   (c) impregnating said preform with a polysilane,
   (d) heating said preform in a first heating step to a temperature sufficient to cure and/or crosslink said polysilane, and
   (e) heating said preform in a second heating step to a temperature sufficient to form a silicon carbide matrix with fibers from said carbon-based fiber cloth embedded therein.

2. A method in accordance with claim 1 wherein said carbon-based fiber cloth is made from a carbon material selected from carbon fiber and ceramic fibers coated with carbon.

3. A method in accordance with claim 1 wherein said boron compound is in the form of an aqueous solution of a boron compound.

4. A method in accordance with claim 3 wherein said boron compound is an aqueous solution of boric acid.

5. A method in accordance with claim 3 wherein said solution is dried to provide a uniform boron compound coating on the carbon fibers of said preform.

6. A method in accordance with claim 4 wherien said boron compound is dispersed throughout said preform at a level of from about 0.1% to about 2% by weight of boron based on the weight of said preform.

7. A method in accordance with claim 1 wherein said polysilane has the formula R$_{2n+2}$Si$_n$ wherein R is a hydrocarbon selected from the group consisting of methyl, ethyl, propyl, phenyl and vinyl groups and n is an integer in the range of from 20 to 200.

8. A method in accordance with claim 6 wherein R is a vinyl group.

9. A method in accordance with claim 6 wherein R is a phenyl group.

10. A method in accordance with claim 6 wherein R is an ethyl group.

11. A method in accordance with claim 6 wherein R is a methyl group.

12. A method in accordance with claim 1 wherein said first heating step is to a temperature of from about 120° C. to about 250° C.

13. A method in accordance with claim 1 wherein said second heating step is to a temperature of from about 700° C. to about 1000° C.

14. A method in accordance with claim 1 wherein pressure is applied during said heating steps.

15. A method in accordance with claim 14 wherein said pressure is in the range of from about 100 psig to about 250 psig.

16. A method in accordance with claim 1 wherien said preform comprises a plurality of carbon-based fiber sheets.

17. A method for making a composite of a silicon carbide matrix with carbon-based fiber sheets embedded therein comprising:
   (a) providing a plurality of carbon-based fiber sheets,
   (b) applying a soluble boron compound to the surface of the fibers which form said sheets, said boron being in a form suitable for disposing a bonding amount of said boron compound onto said fiber surfaces of said sheets,
   (c) impregnating said sheets with a polysilane,
   (d) stacking the impregnated sheets in mating face-to-face relationship to provide a preform,
   (e) heating said preform in a first heating step to a temperature sufficient to cure and/or crosslink said polysilane, and
   (f) heating said preform in a second heating step to a temperature sufficient to form a silicon carbide matrix with fibers from said carbon-based fiber sheets embedded therein.

18. A method for making a composite of a silicon carbide matrix and a carbon-based fiber network, which method comprises coating the fibers of a carbon-based fiber network with a boron compound, said boron compound being dissolved in a solvent suitable for adhering a coating of said boron compound to the exterior surfaces of said fibers, applying a polysilane resin amterial onto said boron-coated fibers, and heating said boron-coated fiber network-resin composite to crosslink said polysilane resin and then transform said crosslinked resin to a silicon carbide matrix having said carbon-based fiber network embedded therein.

19. A method in accordance with claim 18 wherein said fibers are in the form of multifilament tows and are coated with an aqueous solution of boric acid and then dried to provide a uniform boron coating on the carbon fibers prior to application of said polysilane resin.

20. A method in accordance with claim 19 wherein said boric acid is applied at a level of from about 0.1% to about 2% by weight of boron based on the weight of said preform.

* * * * *

UNITED STATES PATENT AND TRADEMARK OFFICE
CERTIFICATE OF CORRECTION

PATENT NO. : 5,067,999

DATED : November 26, 1991

INVENTOR(S) : Streckert et al.

It is certified that error appears in the above-identified patent and that said Letters Patent is hereby corrected as shown below:

On the Title page item [56] References Cited, line 4 under U.S. Patents, change the Patent No. of the Saito reference to --4,197,279--.

Column 1, line 8, after "carbide" insert --matrix--.
Column 2, line 17, change "e al." to --et al.--.
Column 4, line 47, change "wetting bonding" to --wetting/bonding--.
Column 5, line 7, change "1.6-1.8g/c$^3$." to --1.6-1.8g/cm$^3$.--.

Claim 6, Column 5, line 51, change "wherien" to --wherein--.
Claim 16, Column 6, line 18, change "wherien" to --wherein--.
Claim 18, Column 6, line 46, change "amterial" to --material--.

Signed and Sealed this

Twenty-third Day of March, 1993

Attest:

STEPHEN G. KUNIN

*Attesting Officer*   *Acting Commissioner of Patents and Trademarks*